O. P. SMITH & A. W. MILLER.
Pruning-Shears.
No. 154,721.  Patented Sept. 1, 1874.
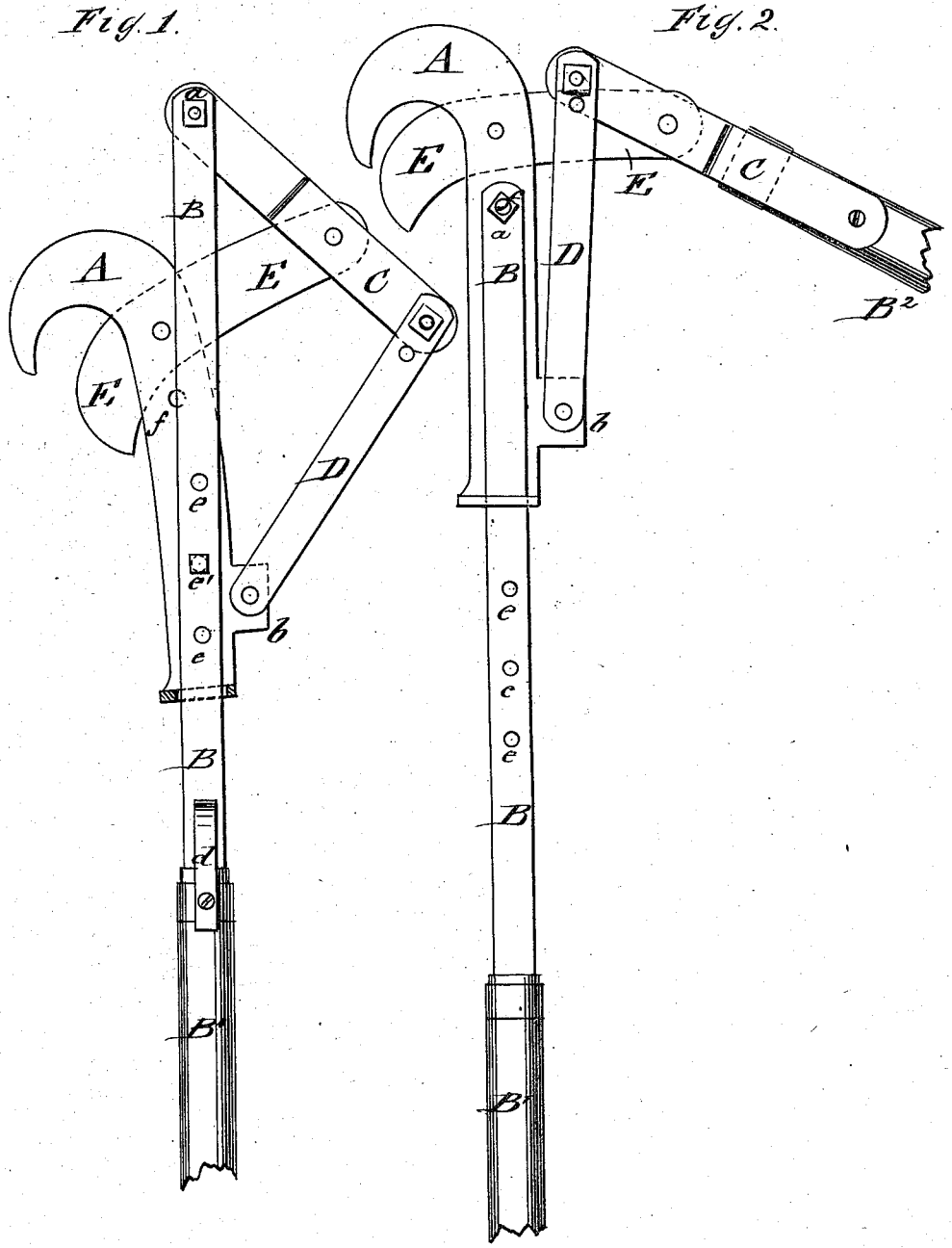

UNITED STATES PATENT OFFICE.

ORSON P. SMITH, OF BUFORD, AND ANDREW W. MILLER, OF MORRISON-VILLE, ILLINOIS.

IMPROVEMENT IN PRUNING-SHEARS.

Specification forming part of Letters Patent No. 154,721, dated September 1, 1874; application filed June 20, 1874.

*To all whom it may concern:*

Be it known that we, ORSON P. SMITH, of Buford, in the county of Macoupin and State of Illinois, and ANDREW W. MILLER, of Morrisonville, in the county of Christian and State of Illinois, have invented a new and useful Improvement in Pruning-Shears, of which the following is a specification:

In the accompanying drawing, Figures 1 and 2 represent side elevations of our improved pruning-shears, which are worked in one position with a single handle, and in the other with two handles.

Similar letters of reference indicate corresponding parts.

This device is an improvement in that class of pruning implements which are adapted, by means of interchangeable parts, to be operated by one or two handles, according to the particular kind of work to be done.

The improvement consists in the novel arrangement and combination of a hooked blade sliding on a bar fixed in the end of the pole or staff, a knife or cutter pivoted to said blade, a changeable handle-lever, and connecting-bar, and an adjustable pivot-screw, all constructed and arranged as hereinafter described.

In the drawing, A represents a hook-shaped cutting-blade, which slides by its slotted and side projecting end on a main bar, B, of suitable length, being socketed to a handle, B'. To the uppermost end of main bar B is pivoted, by a detachable pivot-screw, $a$, the lever C, the opposite end of which is again pivoted in adjustable manner to a brace-bar, D, connecting with an extension-lug, $b$, near the lower end of hook-blade A. A cutting-blade or knife, E, is pivoted to an intermediate point of lever D and to the hook-blade A at suitable distance from the cutting part of the same. A spring, $d$, attached by a set-screw to handle B', serves to secure the sliding part of the hook-blade, for the purpose of keeping the shears in opened position ready for cutting. Several holes, $e$, of main bar B, serve, in connection with a set-screw, $e'$, to adjust the degree of closing of the blades, so that any boy may cut hedge-plants without danger of cutting too much.

The hook-blade is placed on the branch to be cut, and the main bar pulled down, which produces the upward motion of the knife-blade, and the closing of the same on the hook for cutting off the branch or limb. For cutting smaller sprouts, the set-screw $e'$ is inserted into one of the holes $e$, with the slotted end of the hook-blade A above the same, which makes the strokes only half as long as before, and cuts more rapidly.

The weight of the pivoted parts throws the shears instantly into open position after cutting, when held in upright position.

For the purpose of operating the shears with both hands, instead of with one, as described, the pivot-screw $a$ at the upper end of the main bar B is taken off, lever C swung around about an angle of one hundred and eighty degrees, so that its upper bent end becomes free for attaching a second handle, $B^2$, by ferrule and set-screw. The brace bar D swings then between main bar B and the transposed lever C, while the end of the main bar is rigidly fastened to the screw-pivot $a$ to a hole, $f$, of hook-blade A, below the knife-blade, forming thereby one rigid piece with the hook-blade, which offers sufficient resistance for cutting large and small branches by carrying the supplementary handle toward the main handle, admitting thus of a very extensive and convenient use of the shears.

Having thus described our invention, we claim as new and desire to secure by Letters Patent—

The combination, with the main bar B, of the hook-blade A sliding thereon, the connecting brace or bar D, pivoted lever C, and blade E pivoted to parts A and E, and the adjustable screw $a$, all as shown and described, whereby said parts may be adjusted or changed in position to operate with one or two handles, as set forth.

ORSON P. SMITH.
ANDREW W. MILLER.

Witnesses:
JOHN C. MILLER,
ROBERT BACON.